(12) United States Patent
Choi et al.

(10) Patent No.: US 7,327,897 B2
(45) Date of Patent: Feb. 5, 2008

(54) METHOD OF PRECISELY CORRECTING GEOMETRICALLY DISTORTED SATELLITE IMAGES AND COMPUTER-READABLE STORAGE MEDIUM FOR THE METHOD

(75) Inventors: Myung Jin Choi, Daejeon (KR); Tae Jung Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 639 days.

(21) Appl. No.: 10/334,655

(22) Filed: Dec. 30, 2002

(65) Prior Publication Data

US 2004/0120595 A1    Jun. 24, 2004

(30) Foreign Application Priority Data

Dec. 18, 2002    (KR) ...................... 10-2002-0081171

(51) Int. Cl.
*G06K 9/40*    (2006.01)
(52) U.S. Cl. .................... 382/274; 356/139.03; 396/50
(58) Field of Classification Search ................ 382/109, 382/275, 293, 103, 215; 725/48, 63–72; 701/13; 396/50; 356/139.03
See application file for complete search history.

(56) References Cited

U.S. PATENT DOCUMENTS 6,633,665 B1 * 10/2003 Kim et al. .................. 382/154
6,735,348 B2 * 5/2004 Dial et al. .................. 382/293

OTHER PUBLICATIONS

Cheng et al., Urban Planning Using Data Fusion of Satellite and Aerial Photo Images, Aug. 1997, 1997 IEEE International Geoscience and Remote Sensing, vol. 2,pp. 839-841.*
Moreno et al., A Method for Accurate Geometric Correction of NOAA AVHRR HRPT Data, Jan. 1993, IEEE Transactions on Geoscience and Remote Sensing, vol. 31, Issue: 1,pp. 204-226.*
Esposito, P.G. et al., An Application of Genetic Algorithms to the Geometric Correction of HypSEO Hyperspectral Data, Jun. 24-28, 2002, IGARSS '02, vol. 6, pp. 3507-3509.*
Myung Jin Choi and Taejung Kim, Camera Modeling of Linear Pushbroom Images: Performance Analysis, presented at 23$^{rd}$ Asian Conference on Remote Sensing; Nov. 25-29, 2002.

* cited by examiner

Primary Examiner—Matthew C. Bella
Assistant Examiner—Dennis Rosario
(74) Attorney, Agent, or Firm—Graybeal Jackson Haley LLP

(57) ABSTRACT

Disclosed herein is a method of precisely correcting geometrically distorted satellite images. In order to correct a geometrically distorted satellite image, the position and attitude of a satellite must be accurately recognized. In this case, a correlation between the position and attitude values of the satellite exists, so accurate position and attitude values cannot be obtained. Therefore, the present invention accurately obtains position and attitude information of the satellite by separating variables having a high correlation to minimize the correlation between the position and attitude of the satellite and then calculating corresponding variables, and precisely corrects a geometrically distorted satellite image using the position and attitude information of the satellite.

4 Claims, 2 Drawing Sheets

METHOD OF PRECISELY CORRECTING GEOMETRICALLY DISTORTED SATELLITE IMAGES AND COMPUTER-READABLE STORAGE MEDIUM FOR THE METHOD

PRIORITY CLAIM

This application claims priority from Korean patent application No. 2002-81171, filed 18 Dec. 2002, which is herein incorporated by reference.

BACKGROUND OF THE INVENTION

1. Field of the Invention

The present invention relates generally to a method of precisely correcting geometrically distorted satellite images, and more particularly to a method of precisely correcting geometrically distorted satellite images, which measures position and attitude values of a satellite by separating variables having a high correlation therebetween, and which precisely corrects geometrically distorted satellite images using the position and attitude values of the satellite. In addition, the present invention relates to a computer-readable storage medium in which a program for executing the satellite image correcting method with a computer is stored.

2. Description of the Prior Art

Generally, remote sensing data obtained by an artificial satellite or the like may include many errors and distortions according to equipment allowances and atmospheric conditions at the time of observation, the trajectory and photographing position and attitude of a photographing satellite, the curvature and rotation of the earth, etc. Technologies for correcting geometrically distorted satellite images are very important in application fields, such as precise map production, multi-temporal image applications, and remote sensing applications.

Satellite image data including errors and distortions are designated as geometrically distorted satellite images. Such a geometrical distortion can be corrected by geometrically modeling the position of a satellite as shown by the dashed line FIG. 1, the photographing angle of a sensor, the curvature and rotating speed of the earth, etc. Such a geometric distortion correcting method is designated as geometric correction. However, even after the geometric correction is carried out, a remaining error (a difference between an actual ground control point and a corrected ground control point) still exists. The reason for existence of the remaining error is that the determination of the position and attitude of the satellite when the satellite image is photographed is inaccurate.

Therefore, ground control points are extracted from the satellite image, and the position and attitude of the satellite at the time of photographing are obtained using the extracted ground control points, such that the remaining error is eliminated. This process is called precision geometric correction. In this case, the ground control points are coordinates obtained by extracting points, having the same shape in both the satellite image and a reference map, from the satellite image so as to allow the satellite image to correspond to the reference map.

As described above, in order to precisely correct the satellite image, more accurate position and attitude values of the satellite must be obtained. The position and attitude values of the satellite have a high correlation therebetween. This means that the position and attitude values are related to each other, so the variation of one of them influences the other.

Due to the correlation between the position and attitude values of the satellite, it is impossible to accurately estimate position and attitude values using a typical least square method. In the prior art, the correlation therebetween is completely ignored, or a part of variables are set to constants and a plurality of ground control points are used, such that the satellite image is precisely corrected. Therefore, if plural accurate ground control points are used, the remaining error can be reduced, but accurate position and attitude values of the satellite cannot be obtained. In this case, the position and attitude values of the satellite, which are previously obtained, cannot be utilized for precision correction of another satellite image adjacent to the satellite image. Further, precision correction cannot be carried out for a satellite image obtained by photographing an area from which ground control points cannot be extracted.

FIG. 1 illustrates a geometric relationship between image coordinates (x, y) of a satellite image photographed by a camera and coordinates (X, Y, Z) of a ground control point "A". The camera photographs a three-dimensional photographing area as a two-dimensional image, so the coordinates (x, y) of the photographed satellite image and the ground control point (X, Y, Z) have a certain relation. However, since the satellite image is geometrically distorted, a remaining error $\epsilon$ exists between actual coordinates (x, y) corresponding to an arbitrary ground control point and calculated coordinates (x', y') from the geometric modeling. Hereinafter, a method of correcting the remaining error of the satellite image is described in detail.

First, there is set a model that represents a geometric relationship between a reference coordinate system of a camera sensor of a satellite at the time of photographing a satellite image and a reference ground coordinate system of a photographed area (photographed ground surface), or between image coordinates (x, y) and a ground control point A (X, Y, Z). In this case, a geometric model of a linear pushbroom sensor is used as an example. The geometric model of the linear pushbroom sensor is expressed by the following collinearity Equations [1] and [2], $$x = -f \frac{r_{11}(X - X_s) + r_{21}(Y - Y_s) + r_{31}(Z - Z_s)}{r_{13}(X - X_s) + r_{23}(Y - Y_s) + r_{33}(Z - Z_s)} = 0 \quad [1]$$

$$y = -f \frac{r_{12}(X - X_s) + r_{22}(Y - Y_s) + r_{32}(Z - Z_s)}{r_{13}(X - X_s) + r_{23}(Y - Y_s) + r_{33}(Z - Z_s)} \quad [2]$$

where f is a focal length of the camera, and ($X_s$, $Y_s$, $Z_s$) are focal positions of the linear pushbroom sensor and (X, Y, Z) is coordinate of a ground control point. In this case, the focal positions of the linear pushbroom sensor correspond to desired position values of the satellite. Further, $r_{11}$ to $r_{33}$ are elements of a matrix R for rotating a coordinate system of the linear pushbroom sensor so as to allow the linear pushbroom sensor coordinate system to correspond to a ground coordinate system, and the matrix R is expressed by the following Equation [3], $$R = \begin{pmatrix} \cos\phi\cos\kappa & -\cos\phi\sin\kappa & \sin\phi \\ \sin\omega\sin\phi\cos\kappa + \cos\omega\sin\kappa & -\sin\omega\sin\phi\sin\kappa + \cos\omega\cos\kappa & -\sin\omega\cos\phi \\ -\cos\omega\sin\phi\cos\kappa + \sin\omega\sin\kappa & \cos\omega\sin\phi\sin\kappa + \sin\omega\cos\kappa & \cos\omega\cos\phi \end{pmatrix} \quad [3]$$

[3] where κ, φ and ω are rotating angles at which the linear pushbroom sensor coordinate system is rotated around Z, Y and X axes of the satellite coordinate system, respectively, so as to allow the linear pushbroom sensor coordinate system to correspond to the ground coordinate system. Unlike a perspective projection sensor, the linear pushbroom sensor is designed such that its focal positions are determined depending upon lines or parts of a satellite image, and its attitude can vary depending upon lines or parts thereof. Therefore, the focal position values $(X_s, Y_s, Z_s)$ of the linear pushbroom sensor in Equations [1] and [2], and the rotating angles κ, φ and ω thereof can be represented by linear or non-linear polynomial expressions for an image coordinate value x according to a photographing manner or a scanning manner of the linear pushbroom sensor. In this case, κ, φ and ω are desired attitude values of the satellite to be obtained.

As described above, in the collinearity Equations expressed in Equations [1] and [2], the satellite photographs an image while moving along a direction of its movement, so the focal positions of the linear pushbroom sensor, that is, position values $(X_s, Y_s, Z_s)$ of the satellite, and the elements $r_{11}$ to $r_{33}$ of the rotation matrix R are expressed as functions of time, not as constants. In the prior art, the position values $(X_s, Y_s, Z_s)$ and the attitude values (κ, φ and ω) of the satellite are modeled as quadratic equations of time as indicated in the following Equation [4].

$$X_z = X_0 + a_1 t + b_1 t^2 \quad Y_z = Y_0 + a_2 t + b_2 t^2 \quad [4]$$
$$Z_z = Z_0 + a_3 t + b_3 t^2 \quad \kappa_z = \kappa_0 + a_4 t + b_4 t^2$$
$$\phi_z = \phi_0 + a_5 t + b_5 t^2 \quad \omega_s = \omega_0 + a_6 t + b_6 t^2$$

In order to obtain the position and attitude of the satellite in the prior art, φ and ω are assumed to be constants, and quadratic equations of the remaining four variables are applied to the collinearity equations, a linearizing operation is carried out using Taylor's theorem, and unknown values, such as $X_0$, $Y_0$, $Z_0$, $\kappa_0$, $a_1$, $a_2$, $a_3$, $a_4$, $b_1$, $b_2$, $b_3$, and $b_4$, are obtained. Further, using the obtained unknown values, a geometrically distorted satellite image is precisely corrected. In this case, the reason for assuming the functions of time φ and ω to be constants is that a high correlation exists between the functions φ and ω and the position variables of the satellite.

In this way, variables having high correlation are assumed to be constants and equations are solved in the prior art. In this case, if many ground control points are used, the remaining error of the satellite image can be reduced, but accurate position and attitude information of the satellite cannot be obtained.

Generally, if accurate position and attitude information of a satellite is obtained for a satellite image, more accurate position and attitude information of the satellite can be obtained for a satellite image adjacent to the processed satellite image by interpolation. However, in the prior art, accurate position and attitude information of the satellite cannot be obtained, so the obtained position and attitude information cannot be utilized for precision correction of the adjacent satellite image.

SUMMARY OF THE INVENTION

Accordingly, the present invention has been made keeping in mind the above problems occurring in the prior art, and an object of the present invention is to provide a method of precisely correcting geometrically distorted satellite images, which obtains accurate position and attitude information of a satellite by separating variables with a high correlation therebetween to obtain the solutions of non-linear equations, and which precisely corrects geometrically distorted satellite images using the position and attitude information of the satellite.

Another object of the present invention is to provide a computer-readable storage medium in which a program for executing the satellite image correcting method with a computer is stored.

In order to accomplish the above object, the present invention provides a method of precisely correcting geometrically distorted satellite images, using a satellite image and initial position and attitude values of a satellite at the time of photographing the satellite image received from the satellite, comprising the steps of a) establishing a geometric relationship between the satellite image and a ground control point as non-linear equations comprised of position variables and attitude variables of the satellite, and respectively modeling the position variables and the attitude variables to equations of time; b) initializing the attitude variables of the satellite to the initial attitude values provided by the satellite; c) applying the initial attitude values of the satellite and position variable equations of the satellite, obtained by the modeling, to the non-linear equations to obtain position values of the satellite; d) applying the obtained position values of the satellite and attitude variable equations of the satellite, obtained by the modeling, to the non-linear equations to obtain attitude values of the satellite; and e) precisely correcting geometric distortion of the satellite image using the position values and the attitude values of the satellite obtained at steps c) and d).

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of a method of precisely correcting geometrically distorted satellite images and computer-readable storage medium for the method according to the present invention will be described in detail with reference to the attached drawings.

The present invention is a method implemented through an algorithm executed by a typical computer system. The typical computer system comprises a typical input/output device, a microprocessor, a read only memory (ROM), a random access memory (RAM), and a database. The microprocessor entirely controls the computer system. The ROM stores an algorithm for precisely correcting satellite images according to the present invention and provides the algorithm to the microprocessor. The RAM stores data temporarily generated while the microprocessor executes the satellite image correcting method of the present invention. The database stores data required to execute the satellite image correcting method of the present invention.

The microprocessor executes the method of precisely correcting satellite images according to the present invention. In this case, the present invention separates variables having a correlation to minimize the correlation, and then calculates the values of the variables, thus accurately obtaining the position and attitude of a satellite.

Figure 1:
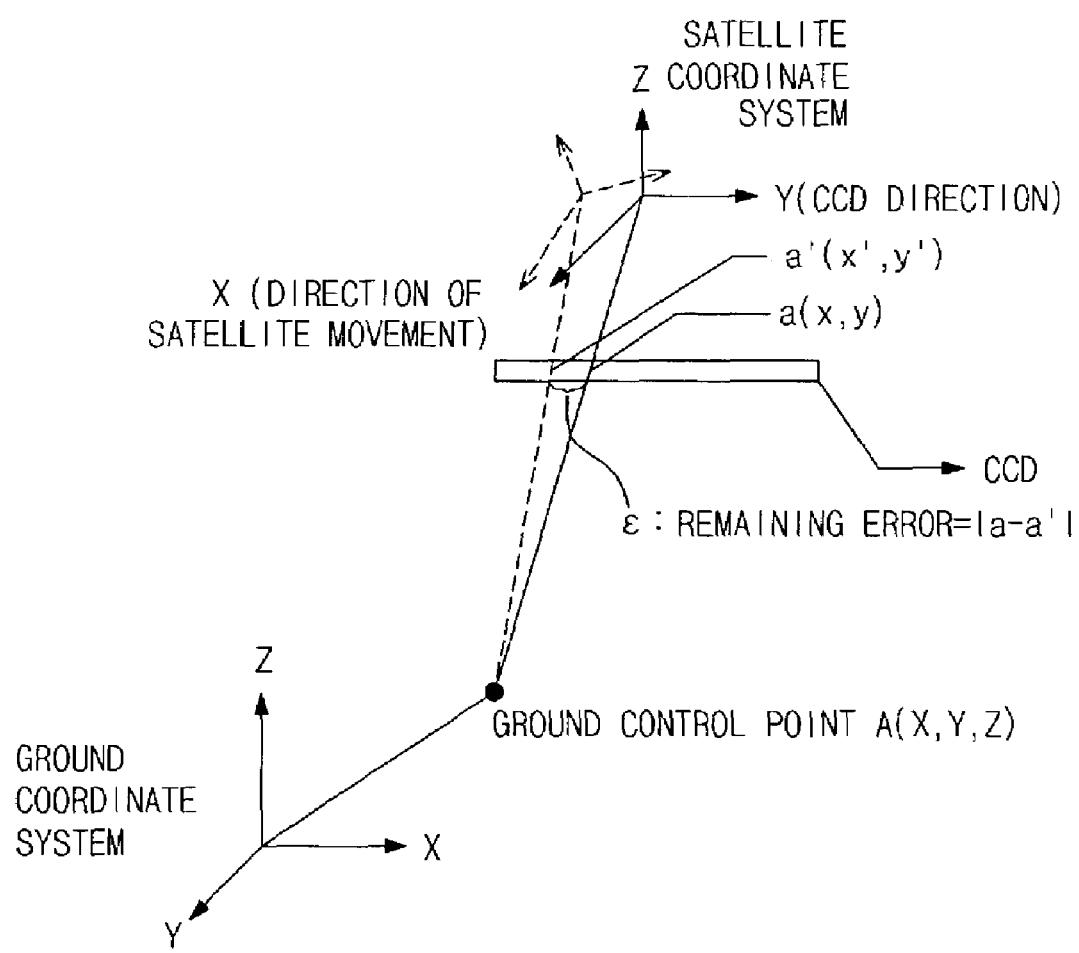
FIG. 1 illustrates a typical geometric relationship between coordinates of a satellite image and a ground control point.
Figure 2:
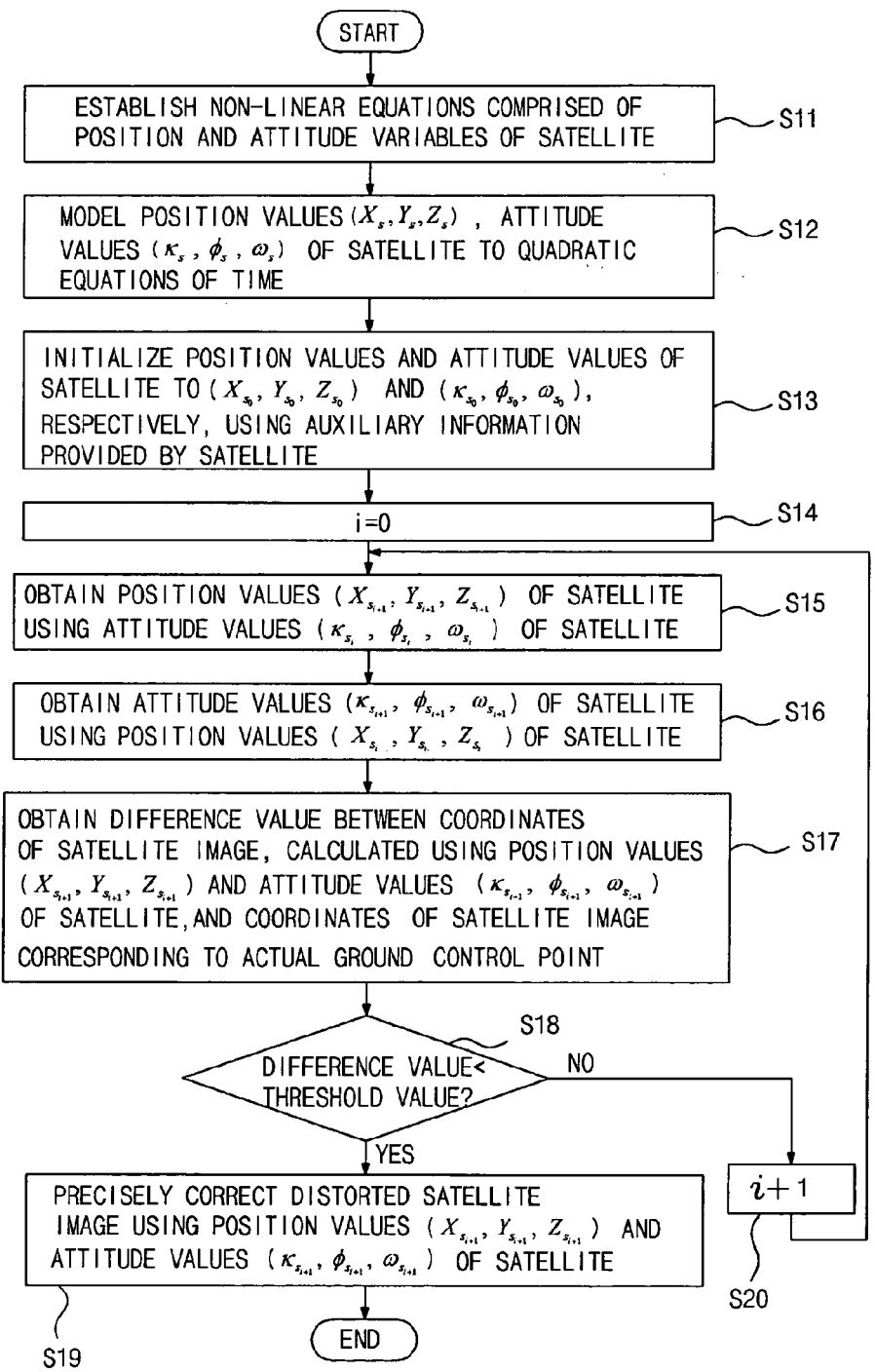
FIG. 2 is a flowchart of a method of precisely correcting satellite images according to the present invention.

Referring to FIG. 2, the method of precisely correcting satellite images according to the present invention is described in detail.

First, non-linear equations consisting of position variables and attitude variables of the satellite are established so as to correct a geometrically distorted satellite image at step S11, wherein the non-linear equations are geometric transforms of a distance between a camera of the satellite and a point on the ground. In the embodiment of the present invention, the geometric model of the linear pushbroom sensor, described as the example in the prior art, is used. However, the present invention is not limited to the geometric model, but can employ any equations as long as the equations are geometric transforms of a distance between camera sensor of a satellite and an arbitrary ground control point.

In the geometric model of the linear pushbroom sensor expressed in Equations [1] and [2], position values ($X_s$, $Y_s$, $Z_s$) of the satellite and attitude values ($\kappa_s$, $\phi_s$, $\omega_s$) of the satellite are modeled as quadratic equations of time at step S12. The quadratic equations are arranged in the following Equations [5] and [6].

$$X_z = X_0 + a_1 t + b_1 t^2 \quad Y_z = Y_0 + a_2 t + b_2 t^2 \quad [5]$$
$$Z_z = Z_0 + a_3 t + b_3 t^2$$

$$\kappa_z = \kappa_0 + a_4 t + b_4 t^2 \quad [6]$$
$$\phi_z = \phi_0 + a_5 t + b_5 t^2$$
$$\omega_s = \omega_0 + a_6 t + b_6 t^2$$

Next, the position values of the satellite of Equation [5] are initialized to ($X_{s_0}$, $Y_{s_0}$, $Z_{s_0}$) using position values contained in auxiliary information provided by the satellite together with the satellite image, and the attitude values of the satellite of Equation [6] are initialized to ($\kappa_{s_0}$, $\phi_{s_0}$, $\omega_{s_0}$) using attitude values contained in the auxiliary information at step S13.

Thereafter, a variable "i" is set to "0" (the variable "i" is used to repeatedly perform the later steps S15 to S18) at step S14. The position variable equations of the satellite in Equation [5] and the attitude values ($\kappa_{s_i}$, $\phi_{s_i}$, $\omega_{s_i}$) of the satellite, converted into constants at step S13, are applied to the collinearity equations of Equations [1] and [2], where if "i" is "0", the attitude values ($\kappa_{s_i}$, $\phi_{s_i}$, $\omega_{s_i}$) of the satellite become the initial attitude values ($\kappa_{s_0}$, $\phi_{s_0}$, $\omega_{s_0}$). Thereafter, the applied results are linearized using Taylor's theorem, and then unknown values, such as $X_0$, $Y_0$, $Z_0$, $a_1$, $a_2$, $a_3$, $b_1$, $b_2$, and $b_3$ used to obtain geometrically corrected position values ($X_{s_{i+1}}$, $Y_{s_{i+1}}$, $Z_{s_{i+1}}$) of the satellite, are obtained. Properly, position values ($X_{s_i}$, $Y_{s_i}$, $Z_{s_i}$) of the satellite are given as initial values while the solutions of the collinearity equations are obtained. If the unknown values are obtained, the position values ($X_{s_{i+1}}$, $Y_{s_{i+1}}$, $Z_{s_{i+1}}$) of the geometrically corrected satellite can be obtained at step S15.

Next, the position values ($X_{s_{i+1}}$, $Y_{s_{i+1}}$, $Z_{s_{i+1}}$) of the geometrically corrected satellite, obtained at step S15, and the attitude variable equations of the satellite in Equation [6] are applied to the collinearity equations of Equations [1] and [2]. Thereafter, the applied results are linearized using Taylor's theorem, and then unknown values, such as t, $\kappa_0$, $\phi_0$, $\omega_0$, $a_4$, $a_5$, $a_6$, $b_4$, $b_5$, and $b_6$ used to obtain the attitude values ($\kappa_{s_{i+1}}$, $\phi_{s_{i+1}}$, $\omega_{s_{i+1}}$) of the geometrically corrected satellite, are obtained. Properly, even in this case, the attitude values ($\kappa_{s_i}$, $\phi_{s_i}$, $\omega_{s_i}$) of the satellite are given as initial values while the solutions of the collinearity equations are obtained. If the unknown values are obtained, the attitude values ($\kappa_{s_{i+1}}$, $\phi_{s_{i+1}}$, $\omega_{s_{i+1}}$) of the geometrically corrected satellite can be obtained at step step S16.

Next, a difference value between coordinates of the satellite image calculated using the geometrically corrected position values ($X_{s_{i+1}}$, $Y_{s_{i+1}}$, $Z_{s_{i+1}}$) and geometrically corrected attitude values ($\kappa_{s_{i+1}}$, $\phi_{s_{i+1}}$, $\omega_{s_{i+1}}$) of the satellite respectively obtained at steps S15 and S16, and actual coordinates (X, Y) of the satellite image corresponding to an actual ground control point, is obtained at step S17. It is determined whether the difference value is less than a threshold value at step S18.

If it is determined that the difference value is less than the threshold value at step S18, the geometrically corrected position values ($X_{s_{i+1}}$, $Y_{s_{i+1}}$, $Z_{s_{i+1}}$) and the geometrically corrected attitude values ($\kappa_{s_{i+1}}$, $\phi_{s_{i+1}}$, $\omega_{s_{i+1}}$) of the satellite, respectively obtained at steps S15 and S16, are applied to a typical precision correction method, thus enabling the geometrically distorted satellite image to be precisely corrected at step S19. Further, if it is determined that the difference value is not less than the threshold value at step S18, the variable "i" is increased by "1" at step S20, and the processing step returns to step S15.

As described above, the present invention provides a method of precisely correcting a geometrically distorted satellite image and computer-readable storage medium for the method, in which variables having a correlation are separated in non-linear equations represented by the position and attitude values of a satellite, and the non-linear equations are simplified to obtain solutions through respective linearizing operations for the separated variables, thus enabling the precise position and attitude of the satellite to be obtained.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of precisely correcting geometrically distorted satellite images, using a satellite image and position and attitude values of a satellite at the time of photographing the satellite image received from the satellite, comprising the steps of:
   a) establishing a geometric relationship between the satellite image and a ground control point as non-linear equations comprised of position variables and attitude variables of the satellite, and respectively modeling the position variables and the attitude variables to equations of time;
   b) initializing the attitude variables of the satellite to the initial attitude values provided by the satellite;
   c) applying the initial attitude values of the satellite and position variable equations of the satellite, obtained by the modeling, to the non-linear equations to obtain position values of the satellite;
   d) applying the obtained position values of the satellite and attitude variable equations of the satellite, obtained by the modeling, to the non-linear equations to obtain attitude values of the satellite; and e) precisely correcting geometric distortion of the satellite image using the position values and the attitude values of the satellite obtained at steps c) and d), if a difference value between coordinates of the satellite image, calculated using the obtained position and attitude values of the satellite, and actual coordinates of the satellite image is less than a threshold value; and f) repeatedly performing the steps c) and d) using the obtained attitude values of the satellite if the difference value therebetween is equal to or greater than the threshold value.

2. The method of precisely correcting geometrically distorted satellite images according to claim 1, wherein the step c) is performed such that the position variable equations of the satellite and the initial attitude values of the satellite are applied to the non-linear equations, the non-linear equations are linearized, and then the position values of the satellite are obtained.

3. The method of precisely correcting geometrically distorted satellite images according to claim 1, wherein the step d) is performed such that the attitude variable equations of the satellite and the position values of the satellite are applied to the non-linear equations, the non-linear equations are linearized, and then the attitude values of the satellite are obtained.

4. A computer-readable storage medium storing a program for executing the steps of:

a) establishing a geometric relationship between a satellite image and a ground control point as non-linear equations comprised of position variables and attitude variables of a satellite, and respectively modeling the position variables and the attitude variables to equations of time, if the satellite image and position and attitude values of the satellite at the time of photographing are received from the satellite;

b) initializing the attitude variables of the satellite to the initial attitude values provided by the satellite;

c) applying the initial attitude values of the satellite and position variable equations of the satellite, obtained by the modeling, to the non-linear equations to obtain position values of the satellite;

d) applying the obtained position values of the satellite and attitude variable equations of the satellite, obtained by the modeling, to the non-linear equations to obtain attitude values of the satellite; and e) precisely correcting geometric distortion of the satellite image using the position values and the attitude values of the satellite obtained at steps c) and d), if a difference value between coordinates of the satellite image, calculated using the obtained position and attitude values of the satellite, and actual coordinates of the satellite image is less than a threshold value; and f) repeatedly performing the steps c) and d) using the obtained attitude values of the satellite if the difference value therebetween is equal to or greater than the threshold value.

\* \* \* \* \*